Feb. 14, 1961   R. J. BUSH   2,972,045
TRACK INSTRUMENTS
Filed June 12, 1958
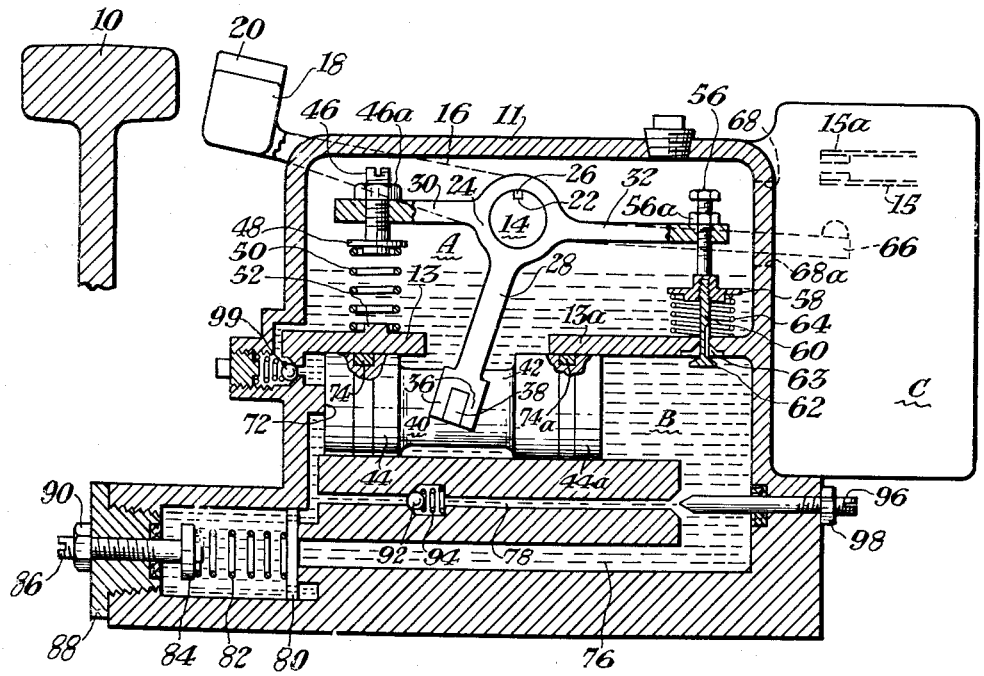
INVENTOR.
Rankin J. Bush.
BY W. L. Stout
HIS ATTORNEY

United States Patent Office 2,972,045
Patented Feb. 14, 1961

2,972,045

TRACK INSTRUMENTS

Rankin J. Bush, Jeannette, Pa., assignor to Westinghouse Air Brake Company, Wilmerding, Pa., a corporation of Pennsylvania Filed June 12, 1958, Ser. No. 741,509

4 Claims. (Cl. 246—248)

My invention relates to track instruments, and particularly to a track instrument, such as a rail contactor, having a treadle adapted to be depressed by the wheels of passing cars, and effective when depressed to operate signaling contacts operatively connected thereto. More particularly, my invention relates to a novel buffer mechanism for use in such track instruments to prevent unauthorized operation of the contactor.

Treadle operated rail contactors for railway operation in which contacts connected with a signal circuit are actuated by depression of the treadle by a car wheel are usually provided with biasing means which continuously urge the treadle to a wheel engaging position. Various biasing means are used, such, for example, as compressible spring members, or hydraulic or pneumatic fluid pressure means. In certain forms of rail contactors wherein the treadle biasing force is provided by a spring member, the spring is constructed to exert a biasing force capable of preventing unauthorized attempts to depress the treadle. This arrangement has the disadvantage that the heavy biasing force tends to return the treadle to its normal position quickly between the passage of successive wheels of the train, thereby subjecting the treadle to repeated impact and causing structural damage to the treadle and to the contactor housing. To prevent repeated displacement of the treadle, a buffer mechanism is usually incorporated into the rail contactor to retard the return of the treadle to its normal position under the influence of the spring biasing member.

Other forms of rail contactors require a force of only a few pounds to displace the treadle from its normal position. These lighter rail contactors can be manufactured at low cost and impose fewer limitations on car speeds, particularly in territories where lightweight trains are operated. However, the use of such rail contactors increases the possibility of unauthorized operation of the signaling circuits because of the ease with which the treadle can be depressed.

Accordingly, an object of my invention is to provide a treadle operated rail contactor which utilizes a light spring to bias the treadle to a wheel engaging position, thereby reducing the restoring force exerted on the treadle tending to return it to its normal position after it has been depressed by a car wheel, but which at the same time protects against unauthorized operation by the use of a suitable buffer mechanism.

Still another object of my invention is to provide a suitable buffer mechanism for cooperation with the light spring to prevent unauthorized attempts to depress the treadle, which buffer mechanism is arranged to operate under a predetermined fluid pressure force created by the wheel pressure exerted on the treadle by a car wheel, and not to operate in response to fluid pressure force created therein by a person standing on the treadle.

Another object of my invention is to provide a suitable buffer mechanism that permits instant movement of the treadle to its depressed position, but which acts to retard movement of the treadle to its normal position until successive car wheels have passed.

A further object of my invention is to provide a rail contactor and a buffer mechanism associated therewith, which contactor is light in weight, economical to manufacture and maintain, and dependable in performance.

According to my invention, the rail contactor is arranged to be secured to a track rail at one side of the rail. A rotatable shaft extends outside of the rail contactor housing and is provided at its ends with arms which support a biased treadle disposed adjacent the rail head in a first position to be depressed by the wheels of a passing car. A buffer mechanism cooperates with the shaft through a piston and cylinder arrangement, and valve means are disposed within the buffer mechanism and are arranged to operate under a predetermined fluid pressure force to permit immediate movement of the treadle in response to a car wheel acting against the same. Other valve means disposed within the buffer mechanism retard movement of the treadle from a second or depressed position to the first or normal wheel engaging position thereof. Means responsive to shaft movement actuate contacts provided in a circuit controller.

The novel features of my invention will be more fully understood from the following description and the accompanying drawing which is a sectional elevation of my rail contactor, the parts thereof being shown in their static positions.

I shall describe one form of rail contactor embodying my invention, and shall then point out the novel features thereof in claims.

Referring now to the drawing, a rail contactor embodying my invention is shown disposed adjacent a track rail 10. The rail contactor comprises a suitable horizontally extending housing 11 divided into two fluid compartments A and B each containing hydraulic fluid, such as oil, and a circuit controller compartment C. The housing 11 is provided with vertical closed end portions (not shown) and is removably secured in place adjacent the inner side of rail 10 by suitable means well known in the art and therefore not shown. Compartments A and B are separated by walls 13 and 13a for a purpose which will be made clear as the description proceeds.

A shaft 14 passes through compartment A and extends outside the housing 11 at each end thereof (not shown). The shaft is provided at its outer ends with arms 16 which support a treadle 18. The treadle 18 is shown in its normal position in which a reinforced surface 20 of the treadle 18 is adapted to be engaged and depressed by the flange portion of a car wheel passing along rail 10. The treadle may comprise other forms well known in the art, for example, a treadle disposed adjacent the rail and supported by a single arm secured to one end of the shaft. Depression of the treadle 18 by the wheel of a passing car rotates the shaft 14 and operates contacts 15 and 15a in circuit controller compartment C in a manner which will be more fully described hereinafter.

The shaft 14 is suitably journaled in bearings (not shown) provided in the end portions of the housing 11 and is adapted to rotate freely in response to wheel pressure exerted on the treadle. The shaft is provided with a spline which forms a keyway 22 extending the length of the shaft. A trident structure 24 provided with a key 26 received by keyway 22 is mounted on shaft 18 and is adapted to rotate therewith. The trident structure 24 is formed with three angularly spaced arms 28, 30 and 32, which arms extend radially therefrom. The first arm 28 extends downwardly into compartment B between the walls 13 and 13a and terminates at its lower end in bifurcated portions 36 which straddle and cooperate with the opposite ends of a pin 38 projecting from a piston 40 in compartment B to move the piston in response to rotation of the shaft. The piston 40 comprises a central portion 42 and opposite piston heads 44 and 44a and is shown in a first position which is the position normally occupied when the treadle 18 is in its first or wheel engaging position.

The second arm 30 of the trident structure 24 is provided at its outer or free end with an adjustable bolt 46 adapted to be locked in place by a lock nut 46a. The head 48 of the bolt cooperates with one end of a compressed coil spring 50, the other end of which surrounds an annular projection 52 formed on the wall 13. The coil spring abutting against bolt head 48 acts through shaft 14 and treadle supporting arms 16 to bias the treadle 18 upwardly to its normal position. Furthermore, spring 50 is selected to compress under a few pounds of force and offers substantially no resistance to movement of arm 30 when the treadle is actuated by a car wheel.

The third arm 32 receives at its outer or free end an adjustable bolt 56 which normally abuts against a spring retainer 58 screwed onto the upper end of a stem 60 of a valve 62. The stem 60 extends through a passageway 63 formed in the wall 13a and is fluted to normally permit communication between compartments A and B when the valve is open. Bolt 56 is locked in place by a nut 56a, and is so adjusted that when treadle 18 occupies its normal position, valve 62 is held open against the bias of a spring 64 disposed between the wall 13a and the spring retainer 58. Valve 62 is held open in the position shown in order to supply fluid compartment B with sufficient fluid.

Secured to shaft 14 for rotation therewith is a circuit controller operating arm 66. The arm 66 extends into circuit controller compartment C through an aperture defined by surfaces 68 and 68a of the housing 11. The oil level in compartment A must understandably be maintained below the surface 68a forming one side of the aperture. The circuit controller arm cooperates with contact elements 15 and 15a to close a contact 15—15a when treadle 18 is depressed by a car wheel. Although only a single controller arm 66 is shown in the accompanying figure, it is to be understood that various modifications may be made in the circuit controller. For example, additional circuit controller operating arms may be connected to the shaft to rotate therewith, and in cooperation with associated contact elements could provide any desired contact combination depending upon the desired use of the rail contactor for signaling purposes.

As previously mentioned, an object of my invention is to permit immediate operation of signaling apparatus or the like controlled by contacts 15 and 15a when the treadle is actuated by a car wheel, and to prevent operation of the signaling apparatus due to unauthorized persons effecting displacement of the treadle. To this end, piston heads 44 and 44a of the piston 40 are adapted for reciprocable movement in a cylinder formed in compartment B of the buffer section. The left-hand end of the cylinder is formed with a shoulder 72 serving as a limit stop for piston 40. Packing rings 74 and 74a surround piston heads 44 and 44a to prevent fluid leakage past the piston heads.

The ends of the cylinder are connected by parallel fluid passages 76 and 78. As shown in the drawing, fluid is normally confined in passageway 76 by a valve 80 biased to a closed position by one end of a spring 82, the other end of which is held by a head 84 of an adjustable bolt 86. The bolt 86 extends through a plug 88 secured in the housing 11 and is held in place by a lock nut 90. Adjustment of bolt 86 to vary the degree to which spring 82 is compressed determines a predetermined minimum fluid pressure force necessary to unseat the valve 80 to permit piston movement from its normal position to its second or actuated position at the opposite end of the cylinder. Fluid pressure forces created within fluid passage 76 which are below the minimum fluid pressure force necessary to unseat valve 80 are thus not effective to permit movement of the piston and rotation of the shaft, thereby preventing unauthorized actuation of the contact 15—15a.

Fluid passage 78 is provided with a ball check valve 92 biased to a closed position by a spring 94. Valve 92 normally prevents fluid from flowing through fluid passage 78 when piston 40 is moved from its normal position to its actuated position and is adapted to open in a reverse direction with respect to valve 80 in response to fluid pressure created by piston movement from its actuated position. A needle valve 96 at the right-hand end of fluid passage 78 for controlling the rate of fluid passing therethrough is screwed through the wall of the housing 11 and is secured in an adjusted position by a lock nut 98.

Disposed in a passageway extending between compartments A and B at the left-hand side of piston head 44 is a spring loaded valve 99 which takes care of the expansion of fluid due to temperature changes. The pressure differential necessary to operate valve 92 is far below the pressure differential necessary to operate the valve 99 which is intended primarily for use as a relief valve.

The operation of the buffer mechanism in resisting an unauthorized load on the treadle is as follows: Depression of treadle 18, for instance, caused by a trespasser standing thereupon, causes treadle arms 16, shaft 14, and the arms 28, 30 and 32 to rotate in a counterclockwise direction. Piston 40 is urged to the right and initial movement of the piston creates a force causing fluid to flow from compartment B into compartment A through passageway 63 in wall 13a. Upward movement of arm 32 carries bolt 56 out of engagement with spring retainer 58 allowing the spring 64 to move stem 60 of valve 62 into passageway 63. The fluid pressure increase at one end of the cylinder created by the advance of piston head 44a to the right further acts to close stem 60 of valve 62. Due to the biasing force acting on valve 80 by spring 82 piston 40 is immediately prevented from further moving toward the right end of the cylinder since the bias exerted by the spring as adjusted by bolt 86 resists the fluid pressure force created in fluid passage 76. Thus, the effect of the unauthorized treadle load is counteracted entirely by the spring acting against valve 80. Since it is apparent that shaft 14 ceases to rotate when valve 62 closes, circuit controller operating arm 66 is held from closing the contact 15—15a, thereby preventing undesired operation of the signaling apparatus controlled thereby.

The depression of treadle 18 by the wheel of a passing car serves to rotate shaft 14, closing passageway 63 to interrupt fluid communication between compartments A and B, substantially as described above. The wheel load acting on the treadle moves piston 40 to the right, thereby exerting a fluid force which is opposed by the bias of the spring 82. The force which is exerted under these conditions is sufficient to overcome the bias exerted by spring 82 on valve 80, thus permitting piston 40 to freely move to its actuated position at the right side of the cylinder. The movement of piston 40 to its actuated position permits unrestricted rotation of shaft 14 which thereby carries circuit controller operating arm 66 into engagement with contact 15 to close the contact 15—15a.

Upon release of the treadle 18, the return spring 50 will tend to return the treadle to its normal position, thus causing the piston 40 to reverse direction. Reverse movement of the piston creates a difference in pressure between the ends of the cylinder. The difference in pressure set up by this movement and the biasing force exerted by spring 82 now act to close valve 80, so that the only fluid communication between the ends of the cylinder is through fluid passage 78. The increase of pressure in fluid passage 78 at the left-hand side of check valve 92 overcomes the bias exerted by spring 94, thus allowing fluid communication through fluid passage 78 around valve 96 to the right side of the cylinder.

It should be made clear that the resistance offered by spring 50 to a load on the treadle is negligible, and that a prolonged time period elapses before spring 50 restores the treadle to its normal position. More gradual return of treadle 18 to its normal position is accomplished by adjustment of the needle valve 96.

It should further be pointed out that because of the inherent light construction of coil spring 50, the retarding effect of the buffer mechanism to an unauthorized load is accomplished solely by the restricted flow of fluid in fluid passage 76.

Although a feature of my invention is to provide a treadle-operated rail contactor having a buffer mechanism capable of resisting unauthorized loads on the treadle, it will be understood that the magnitude of these undesirable loads are far below the weight of the normal actuating load on the treadle, namely, the wheel pressure exerted by a passing car. It should be realized, therefore, that the sustained reaction of the buffer mechanism embodied herein in opposing unauthorized treadle loading will continue for a duration sufficient to discourage the deliberate trespasser or the individual who unintentionally rests upon the treadle.

Although I have herein shown and described a specific construction as evidenced by the accompanying illustration, I do not desire to limit myself to the particular relation of parts or their details of construction or arrangement, as various changes may be made within the scope of the appended claims without departing from the scope of my invention.

Having thus described my invention, what I claim is:

1. A track instrument comprising an actuating member mounted for movement between a first and a second position, a contact, means controlled by said member for actuating said contact in response to movement of said member from its first to its second position, means for biasing said actuating member to its first position, and a buffer mechanism comprising a cylinder, a piston reciprocable in said cylinder between a first and a second position, means operatively connecting said piston with said member for moving said piston between its first and second positions in response to movement of said member between its first and second positions, a first fluid passageway connecting the opposite ends of said cylinder, a first valve means in said first passageway for controlling the flow of fluid in response to movement of said piston from its first toward its second position, a second fluid passageway connecting the opposite ends of said cylinder, a second valve means for preventing the flow of fluid through said second passageway in response to movement of said piston from its first toward its second position but permitting flow of fluid through said second passageway in response to movement of said piston from its second toward its first position, means for controlling the rate of flow of fluid through said second passageway in response to movement of said piston from its second toward its first position to prevent rapid return movement of said actuating member due to its biasing means, and adjustable biasing means cooperating with said first valve means for controlling the fluid pressure required to open said first valve means.

2. A track instrument comprising an actuating member mounted for movement between a first and a second position, a contact, means controlled by said member for actuating said contact in response to movement of said member from its first to its second position, a biasing member operatively connected with said actuating member for biasing said actuating member toward its first position, said biasing member being proportioned to exert a relatively light force in response to movement of said actuating member from its first to its second position, and a buffer mechanism comprising a cylinder, a piston reciprocable in said cylinder between a first and a second position, means operatively connecting said piston with said actuating member for moving said piston between its first and second position in response to movement of said actuating member between its first and second position, a first fluid passageway connecting the opposite ends of said cylinder, a first valve means in said first passageway for controlling the flow of fluid in response to movement of said piston from its first toward its second position, a second fluid passageway connecting the opposite ends of said cylinder, a second valve means in said second passageway for preventing the flow of fluid through said second passageway in response to movement of said piston from its first toward its second position but permitting the flow of fluid through said second passageway in response to movement of said piston from its second toward its first position, means for controlling the rate of flow of fluid through said second passageway in response to movement of said piston from its second toward its first position to prevent rapid return movement of said actuating member due to said biasing member, and adjustable biasing means cooperating with said first valve means for controlling the fluid pressure required to open said first valve means.

3. A track instrument for detecting the passage of a vehicle over a railway track comprising a rotatably mounted shaft, a treadle operatively connected with said shaft and positioned to be moved by the wheels of said vehicle between a first and a second position, means for biasing said treadle to its first position, an electrical contact, means operatively connected with said shaft for actuating said contact in response to movement of said treadle from its first to its second position, and a buffer mechanism comprising a cylinder, a piston slidably mounted in said cylinder for movement between a first and a second position, means operatively connecting said piston with said shaft for moving said piston from its first to its second position in response to movement of said treadle from its first to its second position, first and second fluid passageways connecting the opposite ends of said cylinder, first valve means in said first passageway for controlling the flow of fluid through said first passageway in response to movement of said piston from its first to its second position, second valve means in said second passageway for preventing the flow of fluid through said second passageway in response to movement of said piston from its first toward its second position but permitting flow of fluid through said second passageway in response to movement of said piston from its second position towards its first position, means for controlling the rate of flow of fluid through said second passageway in response to movement of said piston from its second to its first position to prevent rapid return movement of said treadle due to its biasing means, and adjustable biasing means cooperating with said first valve means for controlling the fluid pressure required to open said first valve means, the biasing means being adjusted to permit the opening of said first valve means in response to fluid pressure produced due to engagement between said treadle and the wheels of said vehicle but preventing the opening of said first valve means in response to a man standing on said treadle.

4. A track instrument for detecting the passage of a vehicle over a track comprising a rotatably mounted shaft, a treadle operatively connected with said shaft and positioned to be moved by the wheels of said vehicle between a first and a second position, an electrical contact, means operatively connected with said shaft for operating said contact in response to movement of said treadle from its first to its second position, first adjustable biasing means for biasing said treadle to its first position, said first biasing means being adjusted to exert only a relatively light force in response to movement of said treadle from its first to its second position, and a buffer mechanism comprising a cylinder, a piston slidably mounted in said cylinder for movement between a first and a second position, means operatively connecting said piston with said shaft for moving said piston between its first and second positions in response to movement of said treadle between its first and second positions, first and second fluid passageways connecting the opposite ends of said cylinder, first valve means in said first passageway for permitting the flow of fluid through said first passageway in response to movement of said piston from its first to its second position but preventing the flow of fluid through said first passageway in response to movement of said piston from its second to its first position, second valve means in said second passageway for permitting the flow of fluid through said second passageway in response to movement of said piston from its second to its first position but preventing the flow of fluid through said second passageway in response to movement of said piston from its first to its second position, second adjustable biasing means cooperating with said first valve means for controlling the fluid pressure required to open said first valve means, said second biasing means being adjusted to permit the opening of said first valve means in response to fluid pressure produced by engagement between said treadle and said wheels but not to lesser pressures, and adjustable third valve means for regulating the rate of flow of fluid through said second passageway in response to movement of said piston from its second to its first position, whereby by adjusting said first biasing means and said third valve means the rate of return of said treadle due to its biasing means is controlled.

References Cited in the file of this patent

UNITED STATES PATENTS

| | | |
|---|---|---|
| 1,310,199 | Manton | July 15, 1919 |
| 1,668,267 | Colas | May 1, 1928 |
| 1,911,660 | Weckerly | May 30, 1933 |